United States Patent [19]

Sunaga

[11] Patent Number: 5,080,213
[45] Date of Patent: Jan. 14, 1992

[54] ELECTROMAGNETIC CLUTCH WITH AN ADJUSTING MEANS FOR ADJUSTING A SUBSTANTIAL LENGTH OF A LEAF SPRING WHICH IS FOR SUPPORTING AN ARMATURE PLATE

[75] Inventor: Yoshitaka Sunaga, Isesaki, Japan

[73] Assignee: Sanden Corporation, Japan

[21] Appl. No.: 425,872

[22] Filed: Oct. 24, 1989

[30] Foreign Application Priority Data

Oct. 24, 1988 [JP] Japan .............. 63-137748[U]

[51] Int. Cl.$^5$ .................. F16D 27/10; F16D 27/14
[52] U.S. Cl. ......................... 192/84 C; 192/106.1
[58] Field of Search ........... 192/84 C, 30 V, 106.1, 192/52; 267/160

[56] References Cited

U.S. PATENT DOCUMENTS

| 3,007,561 | 11/1961 | Harting | 192/84 C |
|---|---|---|---|
| 4,227,600 | 10/1980 | Shirai | 192/84 C |
| 4,689,953 | 9/1987 | Wang | 267/160 X |
| 4,694,945 | 9/1987 | Koitabashi | 192/84 C |
| 4,808,870 | 2/1989 | Gonda | 192/84 C X |

FOREIGN PATENT DOCUMENTS

| 53-34045 | 3/1978 | Japan . | |
| 57-192631 | 11/1982 | Japan . | |
| 58-8997 | 2/1983 | Japan . | |
| 58-72727 | 4/1983 | Japan . | |
| 0086721 | 5/1984 | Japan | 192/84 C |
| 60-18625 | 1/1985 | Japan . | |
| 60-139923 | 7/1985 | Japan . | |
| 60-220228 | 11/1985 | Japan . | |
| 60-252830 | 12/1985 | Japan . | |
| 1107089 | 3/1968 | United Kingdom . | |
| 2156013 | 2/1985 | United Kingdom . | |

Primary Examiner—Rodney H. Bonck
Attorney, Agent, or Firm—Banner, Birch, McKie & Beckett

[57] ABSTRACT

In an electromagnetic clutch comprising a plurality of leaf springs for supporting an armature plate (18) to a shaft (14) so that the armature plate (18) faces a pulley (16) in an axial direction with a gap left therebetween, each of the leaf springs has a substantial length which is adjusted in response to a size of the gap. This results in changing of a spring constant of each of the leaf springs. When the armature plate is moved towards the pulley, the size of the gap becomes gradually small. Simultaneously, the armature plate is subjected to a suction force which acceleratingly increases in response to decreasing of the size of the gap. However, it is possible to reduce a noise which is generated when the armature plate is attracted to the pulley. This is because the armature plate comes into soft collision with the pulley.

5 Claims, 4 Drawing Sheets

ELECTROMAGNETIC CLUTCH WITH AN ADJUSTING MEANS FOR ADJUSTING A SUBSTANTIAL LENGTH OF A LEAF SPRING WHICH IS FOR SUPPORTING AN ARMATURE PLATE

BACKGROUND OF THE INVENTION

This invention relates to an electromagnetic clutch used for transmitting rotation from one, for example, a pulley rotated by an automative engine, to another, for example, a drive shaft of an automotive air conditioning compressor.

Such an electromagnetic clutch comprises a first rotary member of a magnetic material rotatable around a predetermined axis extending in a predetermined direction, a second rotary member rotatable around the predetermined axis, an armature plate facing to the first rotary member in the predetermined direction with a gap left therebetween, a plurality of leaf springs for supporting the armature plate to the second rotary member so as to make the armature plate be movable in the predetermined direction, and electromagnetic means for generating a magnetic attraction force to attract the armature plate to the first rotary member to thereby enable rotation transmission between the first and the second rotary members, as is disclosed in, for example, U.S. Pat. No. 4,227,600 (Reference 1) issued to SHIRAI and assigned to SANKYO ELECTRIC COMPANY, LIMITED, GB-A-2156013 (Reference 2) by SANDEN CORPORATION, and others.

In such electromagnetic clutches, each of the leaf springs has a particular portion which causes an elastical bending when the armature plate is moved towards the first rotary member.

However, it is disadvantageous that the electromagnetic clutches generate a relatively large noise whenever the armature plate is attracted to the first rotary member, as will later be described.

SUMMARY OF THE INVENTION

It is therefore an object of the present invention to provide an electromagnetic clutch which reduces a noise generated whenever an armature plate is attracted to a first rotary member by a magnetic attraction force.

It is another object of this invention to provide an electromagnetic clutch of the type described, wherein the armature plate has a speed which is controlled to be relatively low at a time when the armature plate becomes in contact with the first rotary member.

It is still another object of this invention to provide an electromagnetic clutch of the type described, the armature plate is supported by a leaf spring having a spring constant which is adjusted in response to a change of an elastical bending of the leaf spring.

Other objects of this invention will become clear as the description proceeds.

According to this invention, there is provided an electromagnetic clutch which comprises a first rotary member rotatable around predetermined axis extending in a predetermined direction, a second rotary member rotatable around the predetermined axis, an armature plate faced to the first rotary member in the predetermined direction, a plurality of leaf springs for supporting the armature plate to the second rotary member so as to make the armature plate be movable in the predetermined direction, and electromagnetic means for generating a magnetic attraction force to attract the armature plate to the first rotary member to thereby enable rotation transmission between the first and the second rotary members. Each of the leaf springs has a particular portion which causes an elastical bending when the armature plate is moved towards the first rotary member. The electromagnetic clutch further comprises adjusting means coupled to the particular portion and responsive to a change of curvature of the elastical bending for adjusting a length of the particular portion.

DESCRIPTION OF THE PREFERRED EMBODIMENT

Prior to description of embodiment of the present invention, known electromagnetic clutches will briefly be described with reference to FIGS. 1 and 2.

Figure 1:
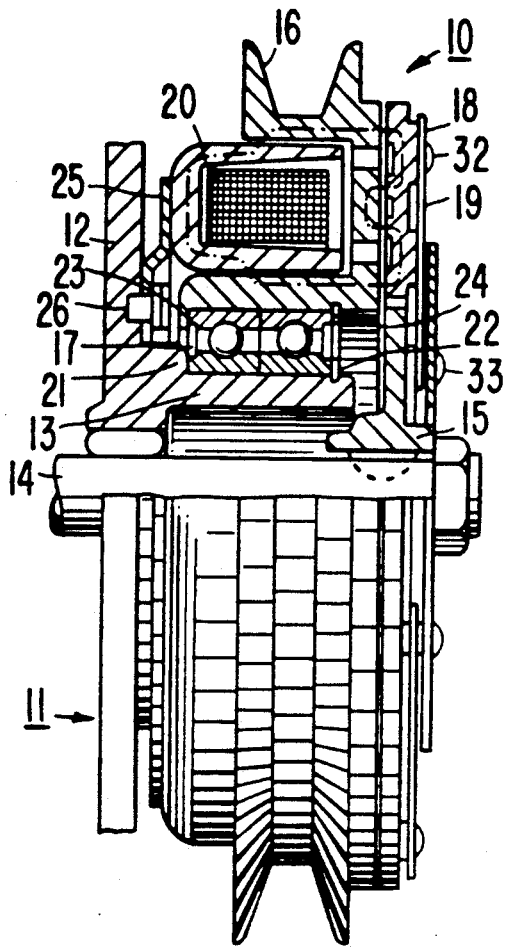
FIG. 1 is a partially sectional side view of a known electromagnetic clutch.

Referring to FIG. 1, the electromagnetic clutch 10 shown therein is one disclosed in Reference 1, which is mounted on a mount 11 having a side wall 12 and a cantilevered tubular extension or support 13 frontwardly projecting therefrom around a central axis which extends in a predetermined direction. Through the tubular extension 13, a rotary shaft 14 extends to an outside extended end on which a hub 15 is non-rotatably mounted.

The electromagnetic clutch 10 is mounted and assembled on the mount 11 and the shaft 14 so as to selectively transmit to the shaft 14 rotation from a power source (not shown).

The electromagnetic clutch 10 comprises a pulley 16 rotatably mounted as a first rotary member by an anti-friction bearing 17 on the tubular extension 13, an armature plate 18 supported on the hub 15 by three leaf springs (only one of which is shown) 19, and an electromagnetic device 20 supported on the mount 11 for selectively generating a magnetic attraction force. Each of leaf springs 19 has a particular constant thickness which will later be clear.

The pulley 16 is made of a magnetic material and has a magnetic frictional surface opposite to the armature plate 18 through a small air gap. The pulley 16 is driven by the power source such as an automotive engine through a V-belt (not shown). When the electromagnetic device 20 is energized to produce a magnetic force, the armature 18 is attracted to the magnetic frictional surface of the pulley 16 against the spring force through the leaf springs 19. Thus, the armature plate 18 and, therefore, the shaft 14 are rotated together with the pulley 16.

In order to insure presence of the small gap between the pulley 16 and the armature plate 18, it is required that the pulley 16 is mounted on the tubular extension 13 without axial movement. To this end, the tubular extension 13 has a collar portion to form a shoulder 21 against which a rear side end of the bearing 17 is attached while a front side end being attached against a snap ring 22 fitted in a groove formed in an outer surface of the tubular extension 13. Thus, the bearing 17 is mounted on the tubular extension 13 without axial movement. The bearing 17 is also fixed to an inner bore of the pulley 16 without axial relative movement by an inwardly extending flange 23 and a snap ring 24.

In order to fixedly support the electromagnetic device 20 without axial and radial movement, the electromagnetic device 20 is supported by a supporting plate 25 which is fixed onto the side wall 12 of the mount 11 by a plurality of rivets 26.

Figure 2:
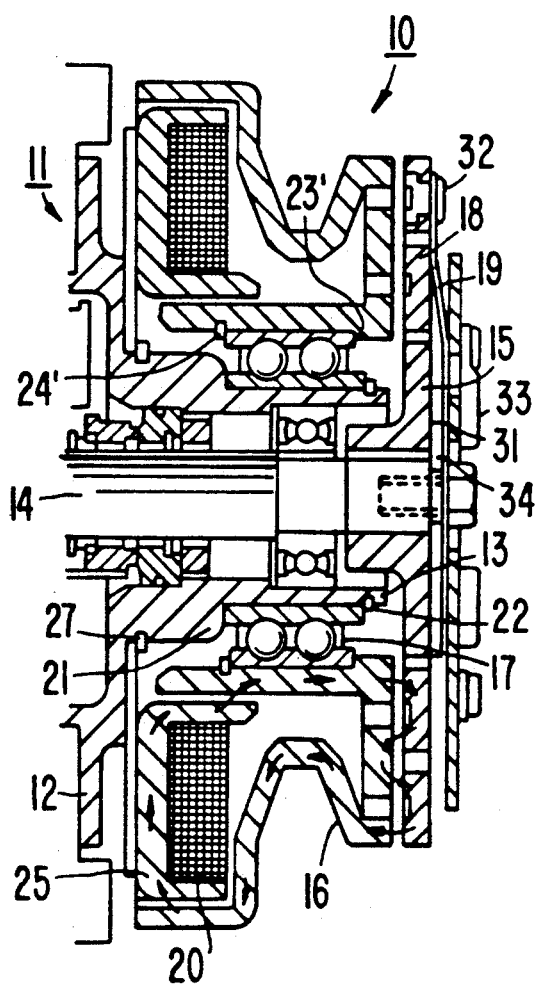
FIG. 2 is a vertical sectional view of another known electromagnetic clutch.

Referring to FIG. 2, another known electromagnetic clutch is shown which is a type disclosed in Reference 2. The electromagnetic clutch has a structure similar to the structure shown in FIG. 1. The similar parts are represented by the same reference numerals as in FIG. 1 and description thereto is omitted for the purpose of simplification of the description.

The known electromagnetic clutch of FIG. 2 is different from that of FIG. 1 in the shape of the pulley 16 and the electromagnetic device 20, in arrangement of a flange 23' and a snap ring 24' for fixing mounting of the bearing 17 to the pulley 16, and in fixture of the supporting plate 25 to the mount 11. A snap ring 27 is used for fixing the supporting plate 25 onto the mount 11.

Description will be directed to structure which is for supporting the armature plate 18 to the hub 15. The hub 15 has an end surface 31 which perpendicularly intersects the above-mentioned central axis. Each of leaf springs 19 has a first and a second end portion which are fixed to the armature plate 18 and the end surface 31 of the hub 15 by short and long rivets 32 and 33, respectively. Each of the short rivets 32 is shorter than each of the long rivets 33 in the predetermined direction. In this event, a ring-shaped plate member 34 is inserted as a spacer between the end surface 31 and the second end portion of each of the leaf springs 19. A combination of the hub 15 and the plate member 34 is referred to as a second rotary member.

When the armature plate 18 is in contact with the magnetic frictional surface of the pulley 16, each of the leaf springs 19 is elastically bent along a predetermined curved line in a particular portion thereof which is between the first end portion and a fulcrum, namely, an outer peripheral edge of the plate member 34. In this connection, the particular portion forms a bent form having an inner surface defined by a first radius of curvature.

Figure 3:
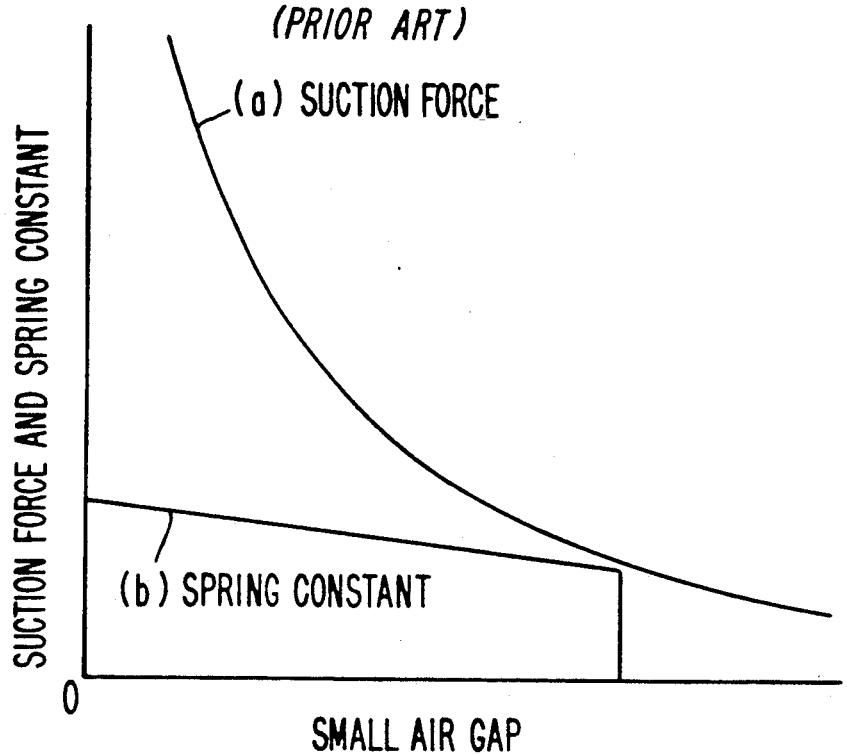
FIG. 3 is a graph representative of a magnetic attraction of an armature included in the electromagnetic clutch of FIG. 2.

The armature plate 18 is subjected to suction force which acceleratingly increases in inverse proportion to a square of the small air gap in dependence of movement of the armature plate 18 towards the pulley 16 as depicted at a line (a) in FIG. 3. On the other hand, each of the leaf springs 19 has a spring constant which is determined in relatively low value in order to enable an attracting of the armature plate 18 and which is depicted at a line (b) in FIG. 3.

However, the electromagnetic clutch generates a relatively large noise whenever the armature plate 18 is attracted to the pulley 16. This is because the armature plate 18 comes into hard collision with the magnetic frictional surface of the pulley 16.

Figure 5:
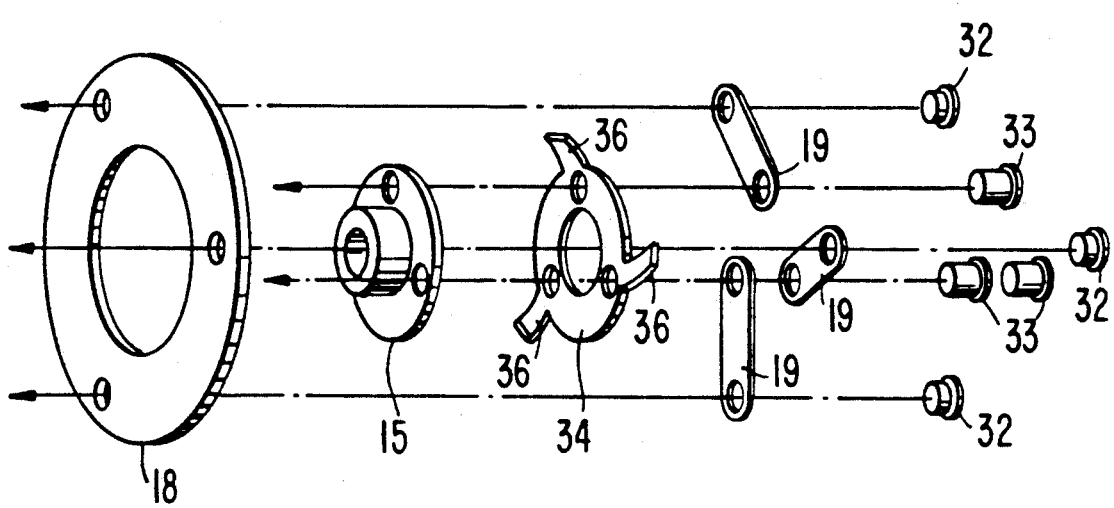
FIG. 5 is an exploded perspective view of a main portion of the electromagnetic clutch illustrated in FIG. 4.
Figure 4:
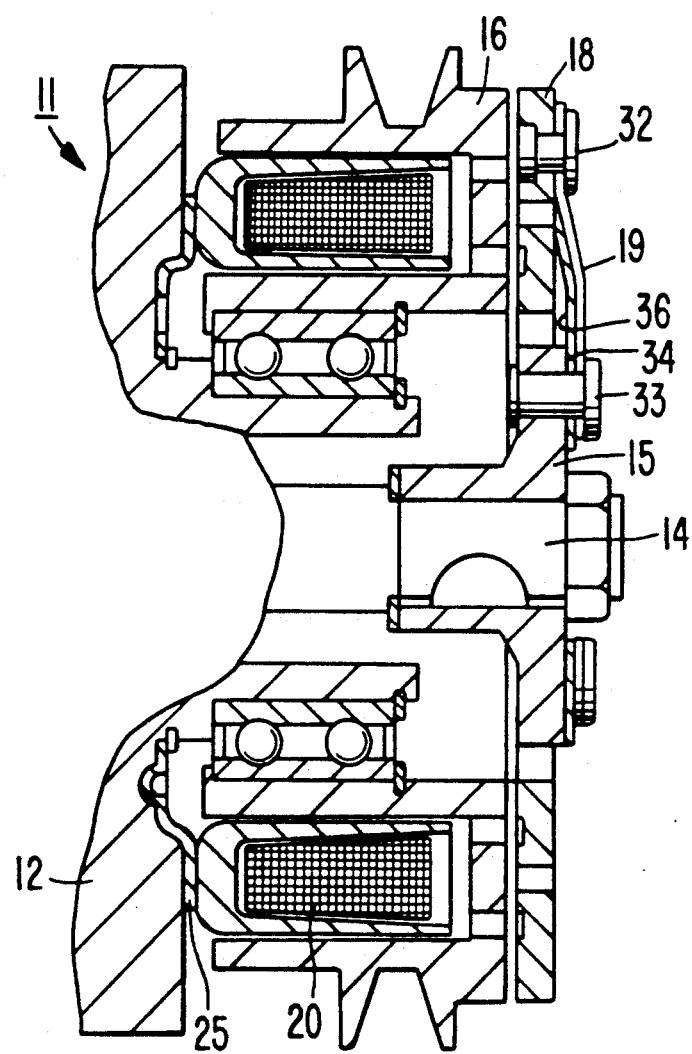
FIG. 4 is a vertical sectional view of an electromagnetic clutch according to an embodiment of this invention.

Referring to FIGS. 4 and 5, description will be made in relation to an electromagnetic clutch according to an embodiment of this invention. Similar parts are designated by like reference numerals.

The electromagnetic clutch comprises three finger portions 36 outwardly projecting from an outer peripheral surface of the plate member 34 with an angular space left therebetween. Each of the finger portions 36 is of a plate shape having a specific constant thickness which is similar to the particular constant thickness of each of the leaf springs 19.

The finger portions 36 face the leaf springs 19 in the predetermined direction, respectively, and extend along the respective leaf springs 19 as will later be clear. Each of the finger portions 36 is previously formed to have a predetermined shape which is similar to the bent form of the particular portion of each of the leaf springs 19. In other words, each of the finger portions 36 has an inner surface defined by the above-mentioned first radius. This means that an outer surface, namely, a principal surface of each of the finger portions 36 has a second radius of curvature which is slightly greater than the first radius.

When the electromagnetic device 20 is supplied with an electric current, the magnetic attraction force is generated to attract the armature plate 18 to the magnetic frictional surface of the pulley 16. Responsive to the magnetic attraction force, the armature plate 18 is moved to approach the magnetic frictional surface in the predetermined direction with the particular portion of each of leaf springs 19 elastically bent.

Description will proceed to operation referring to FIG. 6 together with FIG. 4.

Figures 6A, 6B, 6C:
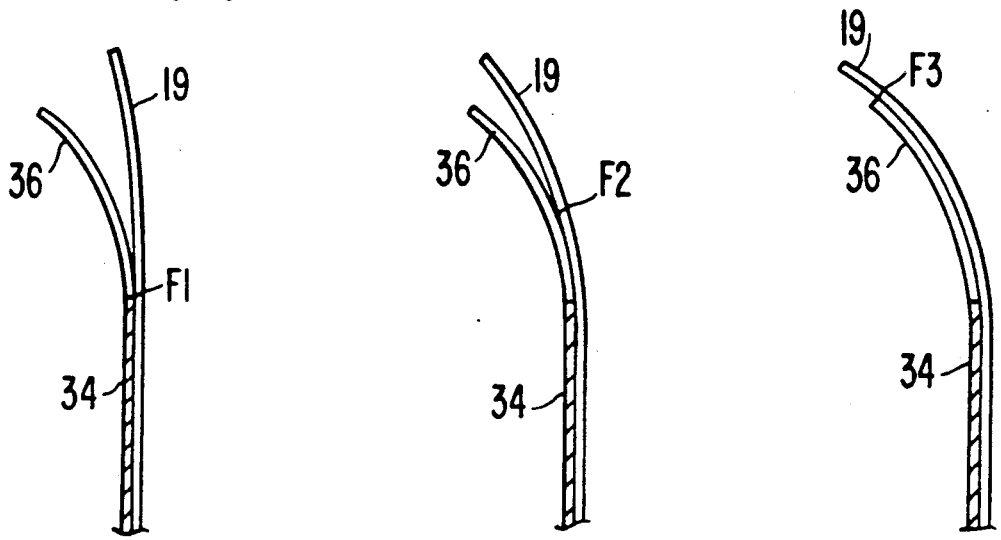
FIGS. 6(a), (b), and (c) are views for describing operation of the electromagnetic clutch of FIG. 4.

At a moment when movement of the armature plate 18 is started, the fulcrum of each of the leaf springs 19 is on the outer peripheral edge of the plate member 34 as depicted at F1 in FIG. 6(a). In the condition, the particular portion has a first length which is longest. Therefore, the spring constant of the particular portion is a low value.

When the armature plate 18 is moved towards the pulley 16, the particular portion is elastically bent to become in contact with the principal surface of each of the finger portions 36. As a result, the fulcrum is moved along the principal surface to a point which is depicted at, for example, F2 in FIG. 6(b). In other words, the fulcrum is displaced in response to a change of curvature of elastical bending of the particular portion. Therefore, a combination of the finger portions 36 is referred to as a displacing arrangement.

In the condition, the particular portion has a second length which is substantially shorter than the first length. Namely, the particular portion has a substantial length which is adjusted in response to the change of the curvature of the particular portion. In the case, the spring constant of the particular portion becomes a middle value which is higher than the low value. A combination of the finger portions 36 may also be referred to as an adjusting arrangement.

When the armature plate 18 becomes in contact with the magnetic frictional surface of the pulley 16, the fulcrum is on a free end of the principal surface as depicted at F3 in FIG. 6(c). In the condition, the particular portion has a third length which is substantially shorter than the second length. Therefore, the spring constant of the particular portion becomes a high value which is higher than the middle value.

Actually, displacing of the fulcrum is gradually carried out along the principal surface. Therefore, the particular portion has a length which is gradually adjusted in response to the change of the curvature of the elastical bending of the particular portion. As a result, the spring constant of the particular portion is changed as depicted at (b) in FIG. 7.

Figure 7:
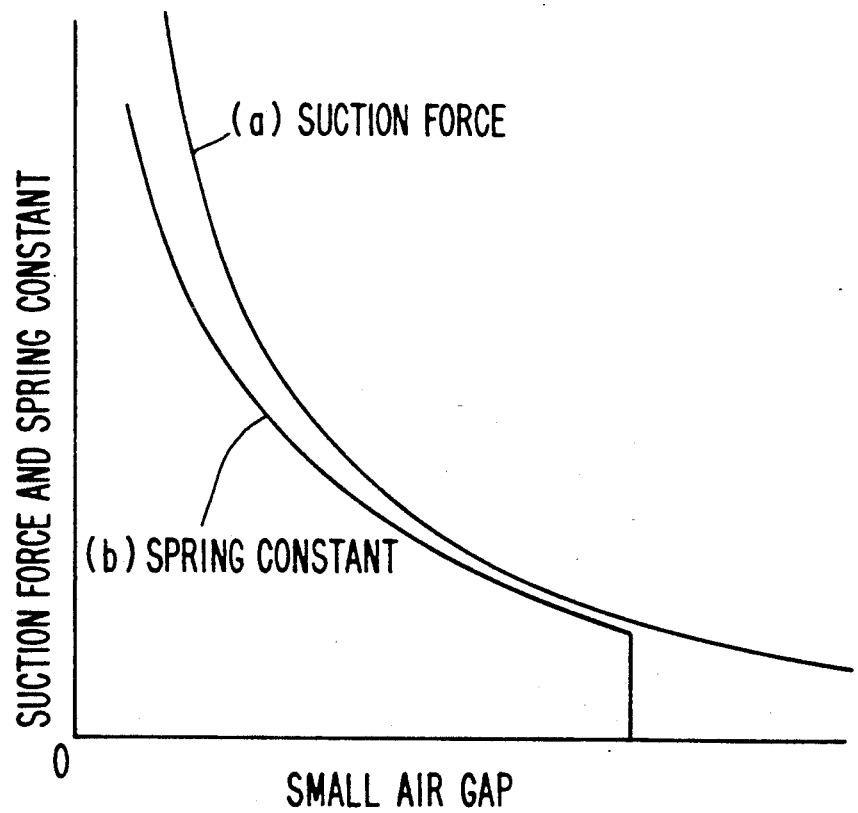
FIG. 7 is a graph representative of a magnetic attraction of an armature plate included in the electromagnetic clutch of FIG. 4.

As will be clearly understood from FIG. 7, the spring constant of the particular portion increases dependent on increasing of the suction force in response to decreasing of the small air gap. Therefore, the armature plate 18 is subjected to a reaction force which is suitably acts against the magnetic attraction force at a moment when the armature plate 18 becomes in contact with the magnetic friction surface of the pulley 16. As a result, the amount of noise which is generated from the electromagnetic clutch when the armature plate 18 is attracted to the magnetic frictional surface of the pulley 16 is reduced. This is because the armature plate 18 comes into soft collision with the magnetic frictional surface in spite of the suction force acceleratingly increased.

While the present invention has thus far been described in connection with only one embodiment thereof, it will readily be possible for those skilled in the art to put this invention into practice in various other manners. For example, each of the finger portions 36 may be made of a spring material so as to produce the reaction force in cooperation with each of the leaf springs 19 when the armature plate 18 is attracted to the magnetic frictional surface of the pulley 16.

What is claimed is:

1. An electromagnetic clutch comprising:
   a first rotary member of a magnetic material rotatable around a predetermined axis extending in a predetermined direction,
   a second rotary member rotatable around said predetermined axis, said second rotary member including
   a hub having an axial end surface which perpendicularly intersects said predetermined axis, and
   a plate member disposed on said axial end surface and having an outer peripheral surface around said predetermined axis,
   an armature plate facing said first rotary member in said predetermined direction with a gap left therebetween,
   a plurality of leaf springs for supporting said armature plate to said second rotary member so as to make said armature plate movable in said predetermined direction, each of said leaf springs having a first and a second end portion mechanically coupled to said armature plate and said second rotary member, respectively, the second end portion of each of said leaf springs being connected to said end surface, and each of said leaf springs having a particular portion which is elastically bent when said armature plate is moved towards said first rotary member, said plate member being inserted between said hub and the second end portion of each of said leaf springs,
   electromagnetic means for generating a magnetic attraction force to attract said armature plate to said first rotary member to thereby enable rotation transmission between said first and said second rotary members, and
   a plurality of finger portions outwardly extending from the outer peripheral surface of said plate member, each of said finger portions having a principal surface facing each of said leaf springs in said predetermined direction to become in contact with said particular portion when said armature plate is attracted to said first rotary member.

2. An electromagnetic clutch as claimed in claim 1, the particular portion of each of said leaf springs being bent along a predetermined curved line when said armature plate is in contact with said first rotary member, said predetermined curved line being defined by a first radius of curvature, wherein the principal surface of each of said finger members has a second radius of curvature which is slightly greater than said first radius.

3. An electromagnetic clutch as claimed in claim 1, the particular portion of each of said leaf springs having a particular thickness and being elastically bent along a predetermined curved line when said armature plate is in contact with said first rotary member, wherein each of said finger portions has a specific thickness which is substantially equal to said particular thickness, each of said finger members being formed to have a predetermined shape which is bent along said predetermined curved line.

4. An electromagnetic clutch which comprises a first rotary member of a magnetic material rotatable around a predetermined axis extending in a predetermined direction, a second rotary member rotatable around said predetermined axis, an armature plate facing said first rotary member in said predetermined direction with a gap left therebetween, a plurality of leaf springs for supporting said armature plate to said second rotary member so as to make said armature plate be movable in said predetermined direction, and electromagnetic means for generating a magnetic attraction force to attract said armature plate to said first rotary member to thereby enable rotation transmission between said first and said second rotary members, each of said leaf springs having a particular portion which is elastically bent when said armature plate is moved towards said first rotary member, wherein the improvement comprises:
   adjusting means coupled to said particular portion and responsive to a change of curvature of said particular portion for adjusting a length of said particular portion, said second rotary member including a hub having an axial end surface which perpendicularly intersects said predetermined axis, and a plate member disposed on said axial end surface and having an outer peripheral surface around said predetermined axis, the second end portion of each of said leaf springs being connected to said end surface, said plate member being inserted between said hub and the second end portion of each of said leaf springs, said adjusting means comprising a plurality of finger portions outwardly extending from the outer peripheral surface of said plate member, each of said finger portions having a principal surface facing each of said leaf springs in said predetermined direction to come in contact with said particular portion when said armature plate is attracted to said first rotary member, wherein said particular portion of each of said leaf springs is bent along a predetermined curved line when said armature plate is in contact with said first rotary member, said predetermined curved line being defined by a first radius of curvature, wherein the principle surface of each of said finger elements has a second radius of curvature which is slightly greater that said first radius.

5. An electromagnetic clutch comprising:

a first rotary member of a magnetic material rotatable around a predetermined axis extending in a predetermined direction;

a second rotary member rotatable around said predetermined axis;

an armature plate facing said first rotary member in said predetermined direction with a gap left therebetween;

a plurality of leaf springs for supporting said armature plate to said second rotary member so as to make said armature plate be movable in said predetermined direction;

electromagnetic means for generating a magnetic attraction force to attract said armature plate to said first rotary member to thereby enable rotation transmission between said first and second rotary members, each of said leaf springs having a particular portion which is elastically bent when said armature plate is moved towards said first rotary member; and adjusting means comprising a plurality of finger portions coupled to and extending outwardly from said second rotary member, each of said finger portions coupled to one of said particular portions of said leaf springs and responsive to a change of curvature of said particular portion of one of said leaf springs for continuously adjusting a length of said particular portion.

* * * * *